United States Patent [19]
Crain et al.

[11] Patent Number: 5,638,719
[45] Date of Patent: Jun. 17, 1997

[54] DUAL DRIVE TRANSMISSION

[75] Inventors: Jack L. Crain; J. C. Jones, both of Marion, Ill.

[73] Assignee: Maytag Corporation, Newton, Iowa

[21] Appl. No.: 541,062

[22] Filed: Oct. 11, 1995

[51] Int. Cl.$^6$ .................................................. F16H 19/08
[52] U.S. Cl. ........................... 74/33; 74/422; 68/23.7
[58] Field of Search .......................... 74/29, 33, 76, 74/81, 89.17, 422; 68/23.7, 133

[56] References Cited

U.S. PATENT DOCUMENTS

| | | | |
|---|---|---|---|
| 1,819,208 | 8/1931 | Staples | 68/133 X |
| 2,161,604 | 6/1939 | Watts | 68/23 |
| 2,161,618 | 6/1939 | Dunham | 68/133 X |
| 2,222,329 | 11/1940 | Watts | 68/23 |
| 2,936,605 | 5/1960 | Loutrel | 68/133 X |
| 5,088,581 | 2/1992 | Duve | 192/46 |
| 5,379,616 | 1/1995 | Bae | 74/33 X |
| 5,509,284 | 4/1996 | Hauser | 68/23.7 |

Primary Examiner—Richard M. Lorence
Attorney, Agent, or Firm—Zarley, McKee, Thomte, Voorhees, & Sease

[57] ABSTRACT

A transmission is provided for converting rotary input into an oscillating output. The transmission includes a housing with an input shaft and an output shaft, and a series of gears interconnecting the shafts. The gears include a pair of rack gears on opposite sides of an output pinion mounted on the output shaft. The rack gears are held in meshing engagement with the output pinion by a carrier which is mounted upon a floating bushing on the output shaft. The floating bushing allows the rack gears and rack carrier to move side-to-side relative to the output shaft, thereby equalizing the load on the rack gears and preventing binding between the teeth of the rack gears and the teeth of the output pinion.

23 Claims, 5 Drawing Sheets

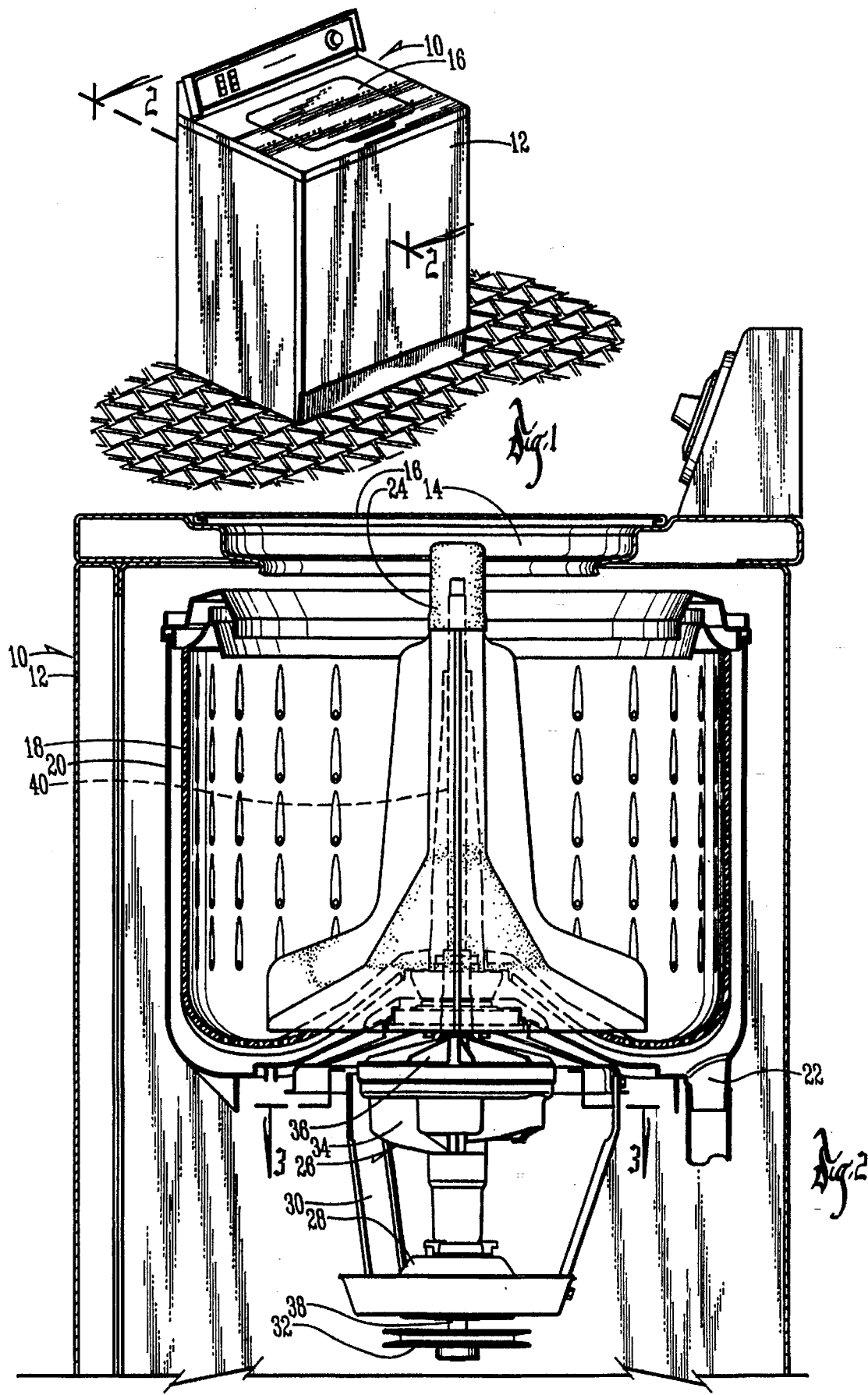

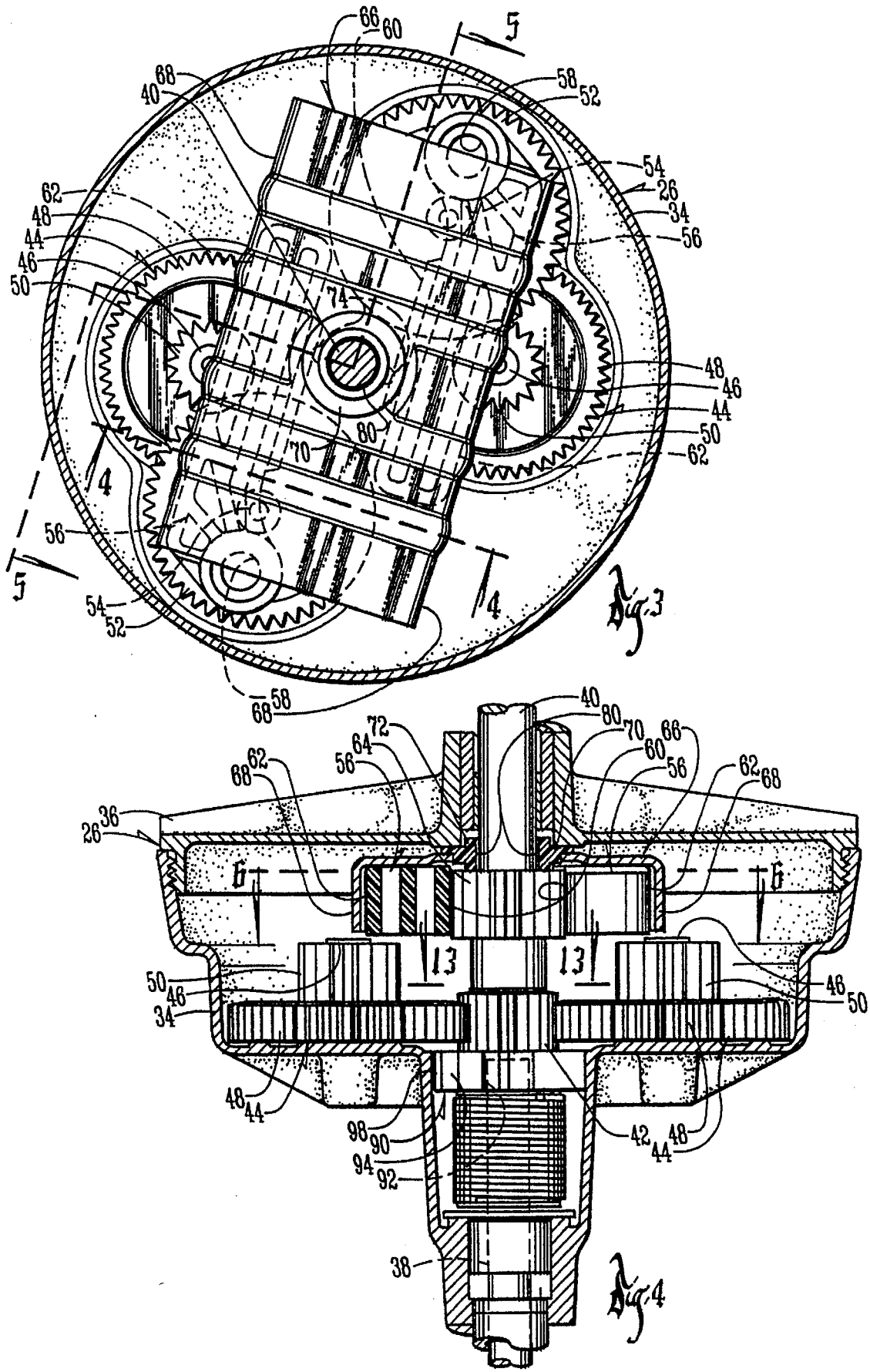

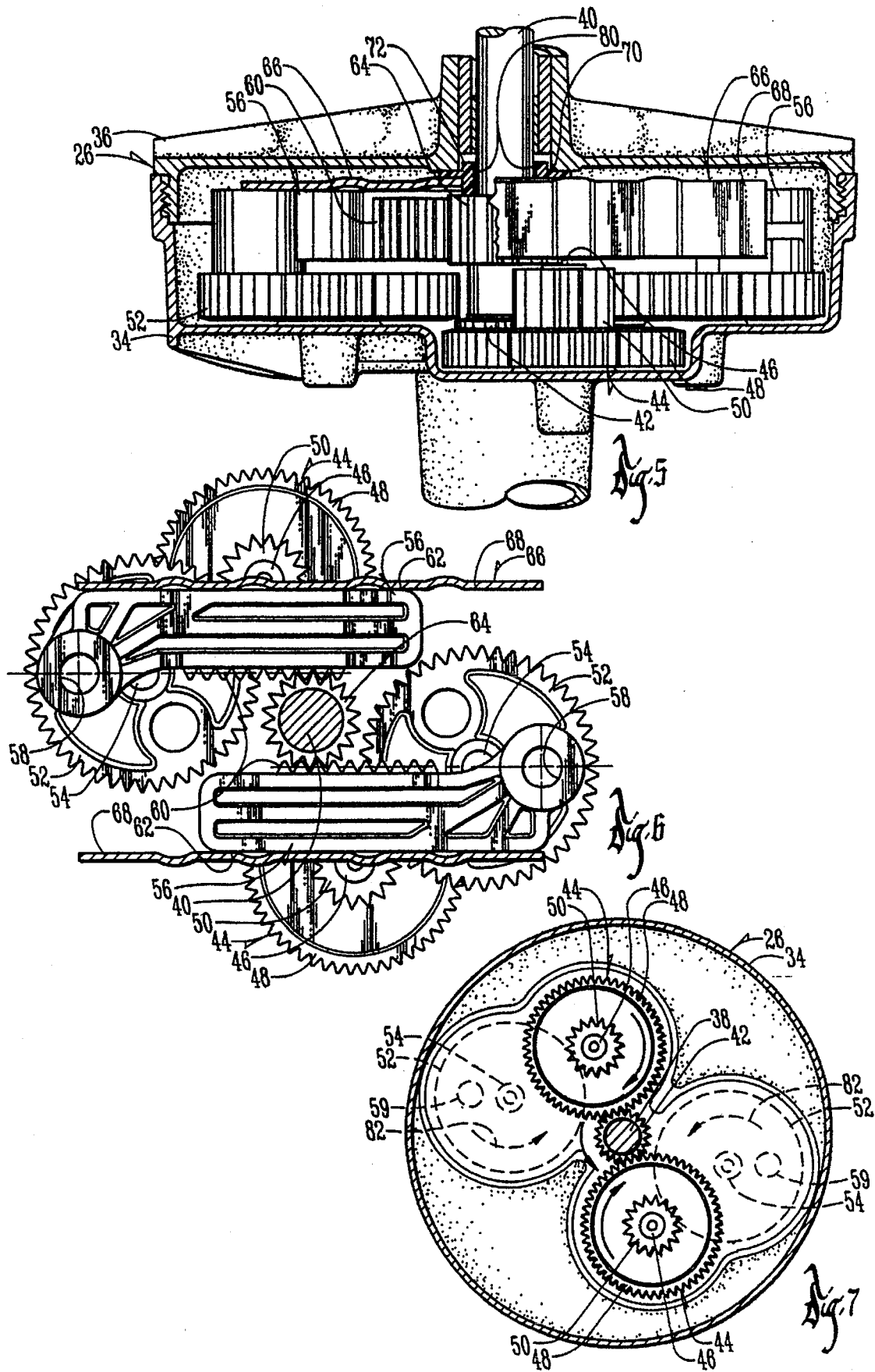

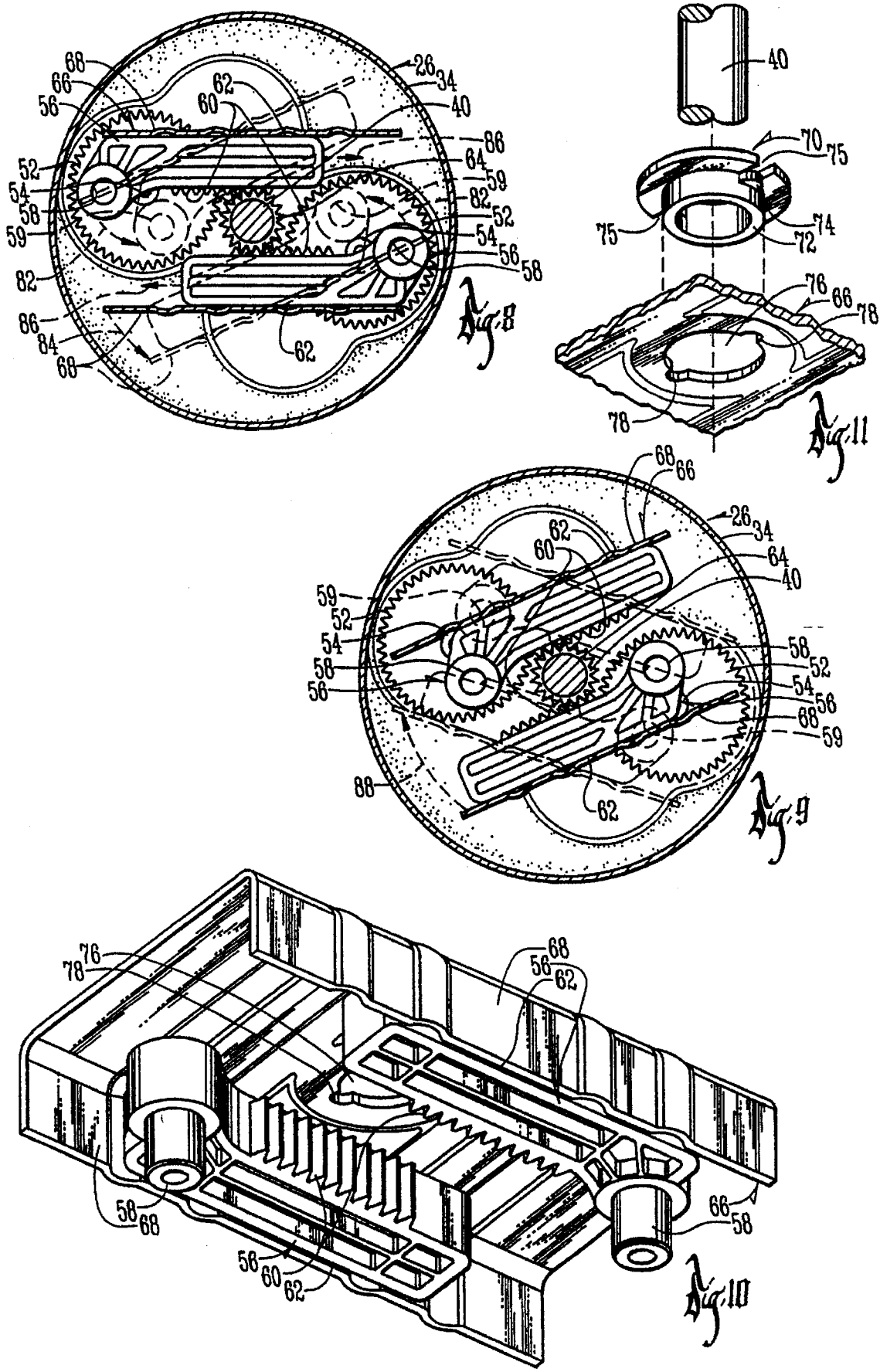

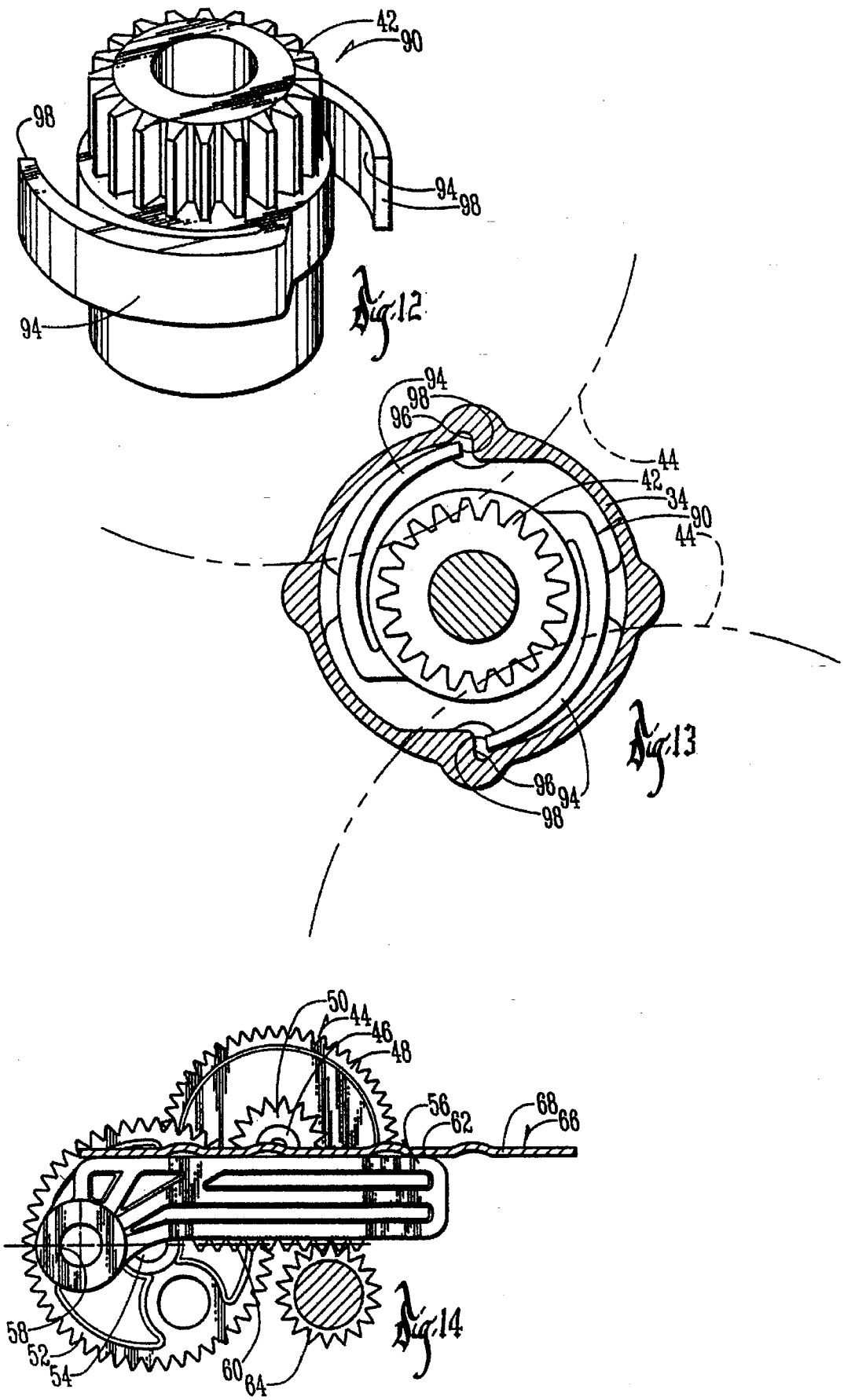

5,638,719

DUAL DRIVE TRANSMISSION

BACKGROUND OF THE INVENTION

Conventional clothes washing machines include an agitator which oscillates during the washing cycle to facilitate the cleaning of clothes. The oscillation of the agitator is achieved through a series of linkages and gears. More particularly, an input shaft is connected to a drive motor and an output shaft is connected to the agitator. An eccentric gear is driven through an arcuate path by a series of gears connected to the input shaft. The eccentric gear is operatively connected to the output shaft, such that the rotary motion from the input shaft is converted into the oscillating motion of the agitator. The off-center linkages require a counterweight for balance. The nonalignment of the shafts produces undesirable side loading on the shafts and gears. The off-center shafts and counterbalance also necessitate a larger transmission housing.

A substantially different washing machine transmission is disclosed in U.S. Pat. Nos. 2,161,604 and 2,222,329 issued in the name of Watts. The Watts patents show opposing rack gears operatively connected to coaxially aligned input and output shafts to convert the rotary motion of the input shaft to an oscillation motion for the output shaft and connected agitator in a clothes washing machine. However, the devices disclosed in the Watts' patents are not believed to have been ever commercialized due to a problem of binding between the rack gears and the output pinion. Such binding necessarily resulted from the lack of radial or side-to-side movement of the rack gears relative to the output pinion.

Accordingly, a primary objective of the present invention is the provision of an improved dual drive transmission which converts rotary movement to oscillating movement.

A further objective of the present invention is the provision of a dual drive transmission for a clothes washing machine having a reduced size, without reducing load carrying capabilities.

Another objective of the present invention is the provision of a dual drive transmission wherein the shafts are co-axially aligned and the gears are equally spaced from the shaft axes.

A further objective of the present invention is the provision of a dual drive transmission wherein gear loading is equalized.

Another objective of the present invention is the provision of rack gears which convert rotary motion to oscillating motion without binding.

Still another objective of the present invention is the provision of an improved dual drive transmission normally having pairs of opposite gears on opposite sides of the drive shaft, and wherein the gears on one side of the shaft may be removed to provide a single drive transmission for reduced capacity machines having lesser power requirements.

A further objective of the present invention is the provision of an improved transmission having an anti-backup mechanism.

These and other objectives will become apparent from the following description of the invention.

SUMMARY OF THE INVENTION

A dual drive transmission is provided to convert rotary action to oscillating action. The transmission can be used on appliances, such as clothes washing machines, wherein both rotary and oscillating action are utilized during the wash cycle. The transmission includes a housing having a removable cover. An input shaft is journaled into the housing and provides rotary motion to the transmission. An output shaft is journaled into the cover and provides an oscillating motion to the agitator of the washer. A series of gears are operatively mounted in meshing combination between the input shaft and the output shaft within the housing. The gearing includes an output pinion attached to the output shaft and a pair of rack gears positioned on opposite sides of and in mesh with the output pinion. A rack carrier having an inverted U-shape has side walls which slidably engage the outer sides of the rack gears to retain the rack gears in mesh with the output pinion. The rack carrier is mounted upon a floating bushing which is pivotally mounted upon the output shaft, and is movable side-to-side relative to the output shaft. The side-to-side movement of the bushing allows the rack carrier and the rack gears to move side-to-side relative to the output pinion, thereby preventing binding between the rack gears and the output pinion. Thus, loading on the rack gears is equalized.

DETAILED DESCRIPTION OF THE DRAWINGS

FIG. 1 is a perspective view of a washing machine.

FIG. 2 is a sectional view taken along lines 2—2 of FIG. 1.

FIG. 3 is a sectional view taken along lines 3—3 of FIG. 2.

FIG. 4 is a sectional view taken along lines 4—4 of FIG. 3, with the crank gears removed for clarity.

FIG. 5 is a sectional view taken along lines 5—5 of FIG. 3.

FIG. 6 is a sectional view taken along lines 6—6 of FIG. 4.

FIG. 7 is a view similar to FIG. 3 with the rack gears and rack carrier removed for clarity.

FIGS. 8 and 9 are sectional views similar to FIG. 6 showing the rack gears at opposite ends of an oscillating stroke.

FIG. 10 is a perspective view of the underside of the rack gears and rack carrier.

FIG. 11 is a partial perspective exploded view showing the rack carrier, the floating bushing, and the output shaft.

FIG. 12 is a perspective view of the anti-backup mechanism of the present invention.

FIG. 13 is a sectional view taken along lines 13—13 of FIG. 4, and showing the anti-backup mechanism of the present invention.

FIG. 14 is a sectional view similar to FIG. 6 showing an alternative embodiment single drive transmission.

BRIEF DESCRIPTION OF THE DRAWINGS

A clothes washer is generally designated in the drawings by the reference number 10. The washer 10 includes a cabinet 12 with an access opening 14 and a door 16 movable between and open and closed positions relative to the access opening 14. The washing machine 10 includes a vertical axis rotatable perforated basket 18 mounted within a tub 20. The tub 20 includes a drain outlet 22. An agitator 24 is operatively mounted within the basket 18.

A transmission housing 26 and a brake housing 28 are mounted to the tub 20 by a plurality of braces 30. A drive pulley 32 is operatively connected to the brake within the brake housing 28 and to the drive train of the transmission in the transmission housing 26. A motor (not shown) is drivingly connected to the pulley 32 with a conventional drive belt (not shown).

The above-described components of the washing machine 10 are conventional, and do not constitute a part of the present invention.

The transmission housing 26 includes a lower casing 34 and a removable upper cover 36. Preferably, the cover 36 is threadably mounted upon the casing 34, as seen in FIG. 4. The transmission includes an input shaft 38 and an output shaft 40. The input and output shafts 38 and 40 are coaxially aligned. The input shaft 38 extends rotatably into the lower transmission casing 34 and is drivingly connected to the pulley 32, which imparts rotational movement to the input shaft 38. The output shaft 40 extends rotatably through the transmission cover 36 and is drivingly connected to the input shaft 38 through a series of gears.

The gear train of the transmission includes an input pinion 42 mounted upon the input shaft 38 for rotation therewith. A pair of cluster gears 44 are mounted on opposite sides of input pinion 42 and are in meshing engagement with the input pinion, as best seen in FIGS. 4 and 7. The cluster gears 44 are each rotatably mounted upon a shaft 46 which is supported by the lower transmission casing 34. Each of the cluster gears 44 include an enlarged gear portion 48 and an integrally formed reduced gear portion 50. The enlarged gear portion 48 of each cluster gear 44 is in meshing combination with the input pinion 42.

The reduced gear portion 50 of each cluster gear 44 is in meshing engagement with a crank gear 52. The crank gears 52 are rotatably mounted upon shafts 54 which extend upwardly from the lower transmission casing 34 on opposite sides of the input shaft 38.

A pair of rack gears 56 are mounted on the crank gears 52. Each rack gear 56 is connected to the corresponding crank gear 52 by a pin 58 extending downwardly from the rack gear and into a hole or aperture 59 in the crank gear. The amount of offset of aperture 59 from the centerline of crank gear 52 controls the degrees of oscillation of the output shaft 40. Each rack gear 56 includes a toothed inner side 60 and an untoothed outer side 62. The rack gears 58 extend on opposite sides of the output shaft 40, and the toothed inner sides 60 are in meshing engagement with an output pinion 64 mounted upon the output shaft 40.

The rack gears 56 are maintained in meshing engagement with the output pinion 64 by a carrier 66. The carrier 66 has an inverted U-shape in cross section, as best seen in FIGS. 4 and 10. The carrier 66 has opposite side walls 68 which slidably engage the outer sides 62 of the rack gears 56, as best seen in FIGS. 4 and 6. The carrier 66 is mounted upon a bushing 70, which in turn is rotatably mounted upon the output shaft 40. As best seen in FIG. 11, the bushing 70 includes a trunk 72 with opposite tabs 74. The trunk 72 is received within a central opening 76 of the carrier 66, and the tabs 74 are matingly received within slots or detents 78 in the carrier 66. As further shown in FIG. 11, the bushing 70 includes slots 75 above the tabs 74. The slots 75 allow oil which is pumped up the output shaft 40 during operation to be channeled onto the top of the carrier 66 and returned to the lower portion of the transmission.

It is critical to the operation of the transmission that the bushing 70 float or move side-to-side side with respect to the solidly journaled output shaft 40. As best seen in FIG. 3, there is a space 80 between the inner diameter of the bushing 70 and the outer diameter of the output shaft 40. Preferably, the difference between the inner diameter of the bushing 70 and the outside diameter of the output shaft 40 is at least 0.03". This space 80 permits the bushing 70, the carrier 66, and the rack gears 56 to float or move side-to-side relative to the output shaft 40 and the output pinion 64 so as to equalize the load on the rack gears 56. Thus, there is some play between the teeth on the inner side 60 of the rack gears 56 and the teeth of the output pinion 64. This floating movement of the rack gears 56 relative to the output pinion 64 prevents binding between the teeth and allows the transmission to run smoothly. It is also important that the centerline of pins 58 and the pitch line of the teeth of the rack gears 56 are aligned, as shown in FIG. 6, so that binding and misalignment during operation are minimized.

As seen in FIGS. 8 and 9, as the rack gears 56 oscillate back and forth along their longitudinal axes, the rack gears 56 slide within the carrier 66. Also, the rack gears 56 pivotally oscillate about the axis of the output shaft 40, along with the carrier 66, via the bushing 70. The oscillating movement of the rack gears 56 and the rotational movement of the carrier 66 are shown in broken lines in FIGS. 8 and 9. More particularly, with respect to FIG. 8, as the crank gear 52 rotates counterclockwise as indicated by arrows 82, the rack gears 56 and carrier 66 pivot counterclockwise relative to the axis of the output shaft as designated by arrow 84, and the rack gears 56 move along their axis, as designated by arrow 86, to turn the output pinion 64 in a clockwise direction. As the counterclockwise rotation of the crank gears 52 continues, as seen in FIG. 9, the movement of the rack gears 56 and carrier 60 reverses, so that the rack gears 56 and carrier 60 will pivot in a clockwise direction, as represented by arrow 88, relative to the axis of the output shaft 40, and the rack gears 56 will move outwardly along their longitudinal axes.

As seen in FIG. 4, a cylindrical anti-backup device 90 has a central bore 92 for mounting the device upon the input shaft 38. The device also includes a pair of radially outwardly projecting spring fingers 94, as best seen in FIGS. 12 and 13. The fingers 94 cooperate with substantially vertically disposed stops or catches 96 on the internal side wall of the transmission housing 26, as more fully described below.

In operation, actuation of the motor (not shown) in one direction turns the drive pulley 32 in a similar direction. The drive pulley 32 in turn imparts rotational movement to the input shaft 38, which similarly rotates the input pinion 42. Rotation of the input pinion 42 turns the cluster gears 44, which, in turn, rotate the crank gears 52. As the crank gears 52 rotate, the interconnection with the rack gears 56 via the rack gear pin 58 reciprocates the rack gears 56 in opposite directions. The reciprocating movement of the rack gears 56 imparts oscillating movement to the output pinion 64, the connected output shaft 40, and the agitator 24. Thus, rotational movement from the input shaft 38 is converted to oscillating movement of the output shaft 40 through the series of gears. As the input shaft 38 rotates in a counterclockwise direction, as seen in FIG. 13, the fingers 94 of the device 90 bias inwardly as the fingers pass over the stops 96 on the transmission housing 26. Thus, the device 90 rotates 360° within the housing 26.

As the load upon the rack gears 56 shifts or changes, the floating bushing 70 allows the carrier 66 and retained rack gears 56 to move side-to-side relative to the output pinion 64 and output shaft 40, thereby equalizing the load forces and preventing binding between the rack gears 56 and the output pinion 64.

The agitator 24, which is connected to the output shaft 40, thus oscillates upon actuation of the motor in a first direction. When the drive motor is actuated in the clockwise direction, as seen in FIG. 13, the brake (not shown) is disengaged and the terminal end 98 of the fingers 94 of the device 90 rotate a maximum of 180° and retentively engage the stops 96 on the transmission housing 26 to allow the entire transmission housing 26, the input shaft 38 and the output shaft 40 to rotate in the same direction. Thus, the rack basket 18 will rotate during the spin cycle of the washing machine 10.

In an alternative embodiment, shown in FIG. 14, the gears on one-half of the input pinion 42 may be removed to provide a single drive transmission for use with a smaller machine having less power requirements. More particularly, in the alternative embodiment, one of each of the pairs of cluster gears 44, crank gears 52, and rack gears 56 are eliminated, all on the same side of the input pinion 42. The rack carrier 66 is still utilized, however, a tighter bushing similar to bushing 70 is utilized to eliminate the float in the remaining rack gear 56, and to maintain proper engagement of the rack gear 56 with the output pinion 40. For example, the clearance between the single drive bushing and the shaft is preferably 0.001–0.009 inch. The single drive transmission of the alternative embodiment does not require any additional counterbalance weight, since the removed gears are displaced by approximately the same weight of oil.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A transmission for converting a rotary input into an oscillating output, comprising:

a housing having a removable cover;

an input shaft journaled into the housing for inputting rotary motion to the transmission;

an output shaft journaled into the cover for outputting oscillating motion;

an output pinion attached to the output shaft inside the housing;

gearing mounted between the input shaft and the output shaft within the housing, the gearing including a pair of rack gears positioned on opposite sides of and in mesh with the output opinion for converting rotary motion from the input shaft into oscillatory motion of the output shaft;

the rack gears having opposite inner and outer sides with gear teeth on the inner sides;

a bushing pivotally mounted on the output shaft between the output shaft and the cover, the bushing being movable by a predetermined side-to-side distance relative to the output shaft; and a rack carrier mounted on the bushing for pivotal and side-to-side movement relative to the output shaft, the rack carrier being in sliding engagement with the outer sides of the rack gears, the rack carrier retaining the rack gears in mesh with the output pinion while the side-to-side movement of the carrier and bushing relative to the output shaft allows the shifting of the gear teeth of each rack gear relative to the output pinion for equalizing the loading on each rack gear.

2. The transmission of claim 1 wherein the bushing has at least one tab matingly received in a slot in the rack carrier such that the bushing and rack carrier pivot together relative to the output shaft.

3. The transmission of claim 1 wherein the rack carrier has a generally inverted U-shaped cross section with opposite side walls of the U-shape being in sliding engagement with the outer sides of the rack gears.

4. The transmission of claim 1 wherein one of the rack gears is removable to provide a single drive transmission.

5. The transmission of claim 1 wherein the teeth of each rack gear define a pitch line, and each rack gear being pivotally mounted upon a crank gear at a pivot point aligned with the pitch line.

6. The transmission of claim 1 further comprising an anti-backup mechanism mounted upon the input shaft, the housing having at least two stops on an inner surface thereof, the anti-backup mechanism having points of engagement with the stops of the housing to lock the housing to the input shaft upon rotation of the input shaft in a first direction.

7. The transmission of claim 6 wherein the points of engagement are defined by a pair of spring fingers which retentively engage the stops upon rotation of the input shaft in the first direction, and which bias away from the stops when the input shaft rotates in the opposite direction.

8. A transmission for converting a rotary input into an oscillating output, comprising:

a housing having a removable cover;

an input shaft rotatably extending into the housing for inputting rotary motion to the transmission;

an output shaft rotatably extending into the cover for outputting oscillating motion;

an output pinion attached to the output shaft inside the housing;

gearing mounted between the input shaft and the output shaft within the housing, the gearing including a pair of rack gears positioned on opposite sides of and in mesh with the output pinion for converting rotary motion from the input shaft into oscillatory motion of the output shaft;

the rack gears having opposite inner and outer sides with gear teeth on the inner sides;

a carrier including a bushing, and being mounted on the output shaft, the carrier and bushing being cooperable for maintaining the rack gears in mesh with the output pinion;

the rack gears being movable side-to-side within the carrier relative to the output pinion to prevent binding between the rack gears and the output pinion.

9. The transmission of claim 8 wherein the carrier slidably extends over the outer sides of the rack gears to maintain the rack gears in meshing engagement with the output pinion.

10. The transmission of claim 8 wherein the bushing is pivotally mounted on the output shaft and supports the carrier.

11. The transmission of claim 8 wherein the bushing and the output shaft have clearance therebetween to allow side-to-side movement of the bushing relative to the output shaft, and thereby side-to-side movement of the teeth of the gear rack relative to the output pinion.

12. The transmission of claim 8 wherein one of the rack gears is removable to provide a single drive transmission.

13. The transmission of claim 8 wherein the teeth of each rack gear defines a pitch line, and each rack gear being pivotally mounted upon a crank gear at a pivot point aligned with the pitch line.

14. The transmission of claim 8 further comprising an anti-backup mechanism mounted upon the input shaft, the housing having at least two stops on an inner surface thereof, the anti-backup mechanism having points of engagement with the stops of the housing to lock the housing to the input shaft upon rotation of the input shaft in a first direction.

15. The transmission of claim 14 wherein the points of engagement are defined by a pair of spring fingers which retentively engage the stops upon rotation of the input shaft in the first direction, and which bias away from the stops when the input shaft rotates in the opposite direction.

16. A method of converting rotary motion to oscillating motion in a transmission having a housing with a removable cover, an input shaft journaled into the housing for inputting rotary motion to the transmission, an output shaft journaled into the cover for outputting oscillating motion, an output gear attached to the output shaft inside the housing, intermediate gearing between the input and output shafts including a pair of rack gears positioned on opposite sides of and in mesh with the output gear for converting rotary motion from the input shaft into oscillatory motion of the output shaft, the method comprising:

rotating the input shaft in one direction, thereby oscillating the rack gears, the meshed output gear and the output shaft;

equalizing the loading on each rack gear by limiting the side-to-side movement of the rack gears with a rack carrier extending over the rack gears and mounted upon a bushing floatably journaled on the output shaft thereby preventing binding between the rack gears and the output gear.

17. The method of claim 16 wherein the load equalization is accomplished by allowing the rack gears to move side-to-side relative to the output gear while maintaining meshing engagement therebetween.

18. The method of claim 16 further comprising rotating the input shaft in an opposite direction, thereby rotating the housing, input shaft and output shaft in unison in the opposite direction.

19. The method of claim 16 wherein the rack gears each have a pivot axis and a plurality of teeth defining a pitch line, the method further comprising aligning the pivot axis of each rack gear with the pitch line of the teeth of the rack gear.

20. The method of claim 18 further comprising engaging an anti-backup mechanism with a stop element on the housing upon rotation of the input shaft in the opposite direction.

21. A transmission for converting a rotary input into an oscillating output, comprising:

a housing having a removable cover;

an input shaft journaled into the housing for inputting rotary motion to the transmission;

an output shaft journaled into the cover for outputting oscillating motion;

an output pinion attached to the output shaft inside the housing;

gearing mounted between the input shaft and the output shaft within the housing, the gearing including a first rack gear positioned in mesh with the output pinion for converting rotary motion from the input shaft into oscillatory motion of the output shaft;

the rack gear having opposite inner and outer sides with gear teeth on the inner side;

a bushing pivotally mounted on the output shaft between the output shaft and the cover, the bushing being movable by a predetermined side-to-side distance relative to the output shaft; and a rack carrier mounted on the bushing for pivotal movement relative to the output shaft, the rack carrier being in sliding engagement with the outer side of the rack gear, the rack carrier retaining the rack gear in mesh with the output pinion.

22. The transmission of claim 21 further comprising a second rack gear positioned in mesh with the output pinion and on the opposite side of the out pinion as the first rack gear.

23. The transmission of claim 21 wherein the rack carrier has side-to-side movement relative to the output shaft to equalize the load on each rack gear.

* * * * *

UNITED STATES PATENT AND TRADEMARK OFFICE
CERTIFICATE OF CORRECTION

PATENT NO.   : 5,638,719
DATED        : June 17, 1997
INVENTOR(S)  : Crain et al It is certified that error appears in the above-indentified patent and that said Letters Patent is hereby corrected as shown below:

In Column 5, line 45, "opinion" should read -- pinion --

Signed and Sealed this

Nineteenth Day of May, 1998

Attest:

BRUCE LEHMAN

Attesting Officer        Commissioner of Patents and Trademarks